United States Patent
Fan et al.

(10) Patent No.: US 9,426,217 B2
(45) Date of Patent: Aug. 23, 2016

(54) SERVICE NODE AND INTER-SERVICE NODE USER PROTOCOL MESSAGE SYNCHRONIZATION METHOD

(75) Inventors: Liang Fan, Shenzhen (CN); Wei Mao, Shenzhen (CN); Weili Chen, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 210 days.

(21) Appl. No.: 14/240,172

(22) PCT Filed: Jun. 13, 2012

(86) PCT No.: PCT/CN2012/076845
§ 371 (c)(1),
(2), (4) Date: Feb. 21, 2014

(87) PCT Pub. No.: WO2013/026308
PCT Pub. Date: Feb. 28, 2013

(65) Prior Publication Data
US 2014/0195693 A1    Jul. 10, 2014

(30) Foreign Application Priority Data

Aug. 23, 2011 (CN) .......................... 2011 1 0242661

(51) Int. Cl.
*G06F 15/16* (2006.01)
*H04L 29/08* (2006.01)
(Continued)

(52) U.S. Cl.
CPC .......... *H04L 67/1095* (2013.01); *H04L 12/287* (2013.01); *H04L 12/4633* (2013.01); *H04L 67/10* (2013.01); *H04L 67/327* (2013.01)

(58) Field of Classification Search
CPC ... H04L 67/1095; H04L 67/327; H04L 67/10; H04L 12/287

USPC .................. 709/232, 203, 204, 225; 370/401
See application file for complete search history.

(56) References Cited

U.S. PATENT DOCUMENTS 6,330,602 B1 * 12/2001 Law .................... H04L 67/1095
                                                                370/401
6,502,131 B1 * 12/2002 Vaid et al. ..................... 709/224
(Continued)

FOREIGN PATENT DOCUMENTS

CN          101588304       11/2009
CN          101841432        9/2010
(Continued)

OTHER PUBLICATIONS

International Search Report for PCT/CN2012/076845, English translation attached to original, Both completed by the Chinese Patent Office on Aug. 14, 2012, All together 5 Pages.
(Continued)

*Primary Examiner* — Thu Ha Nguyen
(74) *Attorney, Agent, or Firm* — Brooks Kushman P.C.

(57) ABSTRACT

A method is disclosed for synchronizing user protocol messages between service nodes. The method includes, when receiving a user-related protocol message, a service node judging whether a state of a backup group to which a user belongs corresponding to the protocol message is active or standby on the service node, and according to a type of the protocol message, determining whether to send the protocol message to another service node on which the state of the backup group is standby or active. The method also includes, when determining to send the protocol message, the service node encapsulating the protocol message through a service backup protocol and sending the protocol message to the other service node. A service node includes a message receiving module, a state judging module and a message sending module.

5 Claims, 3 Drawing Sheets

(51) Int. Cl.
*H04L 12/28* (2006.01)
*H04L 12/46* (2006.01)

(56) References Cited

U.S. PATENT DOCUMENTS

| | | | |
|---|---|---|---|
| 7,013,482 B1* | 3/2006 | Krumel | 726/13 |
| 8,346,959 B2* | 1/2013 | Deshpande | 709/233 |
| 9,009,332 B1* | 4/2015 | Remizov | 709/227 |
| 2001/0037387 A1* | 11/2001 | Gilde | H04L 12/26 709/225 |
| 2002/0019879 A1* | 2/2002 | Jasen et al. | 709/240 |
| 2002/0083331 A1* | 6/2002 | Krumel | 713/200 |
| 2002/0103931 A1* | 8/2002 | Mott | 709/245 |
| 2007/0260901 A1 | 11/2007 | Berenbaum et al. | |
| 2007/0261112 A1* | 11/2007 | Todd et al. | 726/11 |
| 2008/0082640 A1* | 4/2008 | Chang et al. | 709/220 |
| 2008/0181233 A1* | 7/2008 | Washam et al. | 370/395.5 |
| 2008/0215672 A1* | 9/2008 | Kloba et al. | 709/203 |
| 2009/0006879 A1 | 1/2009 | Haag et al. | |
| 2010/0131660 A1 | 5/2010 | Dec et al. | |
| 2010/0185730 A1* | 7/2010 | Sebastian | H04L 12/1859 709/204 |
| 2011/0039579 A1* | 2/2011 | Karjalainen | 455/456.1 |
| 2013/0066951 A1* | 3/2013 | Agranat | H04J 14/0227 709/203 |
| 2013/0080656 A1* | 3/2013 | Kukreja et al. | 709/232 |
| 2013/0332555 A1* | 12/2013 | Gabriel et al. | 709/208 |
| 2014/0007241 A1* | 1/2014 | Gula | H04L 63/1433 726/25 |
| 2014/0013434 A1* | 1/2014 | Ranum | H04L 63/145 726/24 |

FOREIGN PATENT DOCUMENTS

| | | |
|---|---|---|
| CN | 101902360 | 12/2010 |
| JP | 2009290353 | 12/2009 |

OTHER PUBLICATIONS

Extended European Search Report for European Application No. 12825284.8, Completed by the European Patent Office, Dated Nov. 10, 2014, 6 Pages.

* cited by examiner

SERVICE NODE AND INTER-SERVICE NODE USER PROTOCOL MESSAGE SYNCHRONIZATION METHOD

CROSS-REFERENCE TO RELATED APPLICATION

This application is the U.S. national phase of PCT Appln. No. PCT/CN2012/076845 filed Jun. 13, 2012 which claims priority to Chinese Application No. 201110242661.1 filed Aug. 23, 2011, the disclosures of which are incorporated in their entirety by reference herein.

TECHNICAL FIELD

The present document relates to a technique of inter-device user backup in the communication field, and particularly, to a service node and a method for synchronizing user protocol messages between service nodes.

BACKGROUND OF THE RELATED ART

With the increasing of the number of broadband users accessed by and the number of the types of services borne on Service Nodes (SN) such as devices including a Broadband Remote Access Server (BRAS), a Service Router (SR), a Broadband Network Access Server (BNAS) and a Broadband Network Gateway (BNG) and so on, the broadband users have increasingly higher requirements on high reliability of broadband services and broadband networks, and the importance of user backup demand between the service nodes is also rising continuously.

The current user backup ways are divided into two ways: cold backup and hot backup. The cold backup can implement a fault secure on the SN and uplinks and downlinks thereof, and when a fault occurs, a secure effect is implemented through switching between the SN devices, but the users are required to reacquire a network address, and most of the services including real-time services also need to be retriggered. The hot backup way requires that all state information of the users should be synchronized in real time on two SNs, including a user online state, a service state and a protocol state and so on, the advantage of the hot backup lies in that a fault secure unperceived by the users can be implemented, and when a fault occurs on the SN or the uplinks and downlinks thereof, switching between the SNs can be implemented and user addresses and services can be kept without interruption.

In the hot backup scheme, protocol state backups of the users include state backups for various protocols, such as states of user access protocol (i.e. Point to Point Protocol (PPP)), Dynamic Host Configuration Protocol (DHCP), user authentication authorization and accounting protocol (i.e. Remote Authentication Dial In User Service (Radius)), portal authentication protocol (Portal), and a tunnel of a user-related network side protocol (i.e. Layer 2 Tunneling Protocol (L2TP)) and a session state and so on. When there exist multiple backup groups between an active BNAS device and a standby BNAS device, multiple backup groups of the same service node may share the same Authentication Authorization and Accounting (AAA) server, DHCP server or Portal server and so on. If these backup groups perform message interaction with these servers through uniform local Internet Protocol (IP) addresses, when a state of a certain backup group on a service node turns from an active state into a standby state and states of other backup groups still keep active (for example, a fault occurs in a downlink of the service node corresponding to the backup group), the service node will still receive the protocol messages related to all the users which are sent from the servers to the service node, such as Change of Authorization (COA) message of the Radius and so on, including messages related to the user in a backup group whose state has been switched to standby, but it is required to send this part of protocol messages to a service node on which a state of the backup group is active at this point (this requirement cannot be met in the related art). Therefore, it will cause that the user-related protocol messages in a user service backup protocol cannot be completely synchronized.

If it is wished to correctly send all the user-related protocol messages such as Radius, DHCP and Portal of each backup group to the service node on which the state of the backup group is active, it is required to set a separate local IP address for each backup group so as to communicate with theses servers and to configure different backup groups to go through different local IP addresses on the service node; thus, protocol connection required to be maintained by the server side is aggravated, and meanwhile configuration complexity and configuration error risk of the service nodes are also aggravated.

SUMMARY OF THE INVENTION

In view of this, the main object of the present document is to provide a service node and a method for synchronizing user protocol messages between service nodes, to solve the problem that user-related protocol messages cannot be completely synchronized existing in a user service backup protocol.

In order to achieve the foregoing objects, the technical scheme of the present document is implemented as follows.

The present document provides a method for synchronizing user protocol messages between service nodes, which comprises:

when receiving a user-related protocol message, a service node judging whether a state of a backup group to which a user belongs corresponding to the protocol message is active or standby on the service node, and according to a type of the protocol message, determining whether to send the protocol message to another service node on which the state of the backup group is standby or active; and when determining to send the protocol message, the service node encapsulating the protocol message through a service backup protocol and sending the protocol message to the other service node.

Preferably, the method further comprises:

when the type of the protocol message received by the service node is a protocol message from an Authentication Authorization and Accounting (AAA) server, a Dynamic Host Configuration Protocol (DHCP) server or a portal authentication protocol (Portal) server, if a state of a backup group to which a user belongs corresponding to the protocol message is standby on the service node, the service node sending the protocol message to the other service node on which the state of the backup group is active.

Preferably, the method further comprises:

when the type of the protocol message received by the service node is a Layer 2 Tunneling Protocol (L2TP) tunnel control message, if a state of a backup group to which a user belongs corresponding to the L2TP tunnel control message is active on the service node, the service node sending the L2TP tunnel control message to the other service node on which the state of the backup group is standby.

Preferably, the service backup protocol comprises: a Broadband Network Access Server (BNAS) device service backup protocol and an inter-chassis communication protocol.

The present document further provides a service node, which comprises:

- a message receiving module, configured to: receive a user-related protocol message;
- a state judging module, configured to: judge a state of a backup group to which a user belongs corresponding to the protocol message on the service node, wherein the state is active or standby; and according to a type of the protocol message, determine whether to send the protocol message to another service node on which the state of the backup group is standby or active; and
- a message sending module, configured to: when determining to send the protocol message, encapsulate the protocol message through a service backup protocol and send the protocol message to the other service node.

Preferably, the state judging module is further configured to: when the type of the protocol message received by the message receiving module is a protocol message from an Authentication Authorization and Accounting (AAA) server, a Dynamic Host Configuration Protocol (DHCP) server or a portal authentication protocol (Portal) server, if a state of a backup group to which a user belongs corresponding to the protocol message is standby on the service node, determine to send the protocol message to the other service node on which the state of the backup group is active.

Preferably, the state judging module is further configured to: when the type of the protocol message received by the message receiving module is a Layer 2 Tunneling Protocol (L2TP) tunnel control message, if a state of a backup group to which a user belongs corresponding to the L2TP tunnel control message is active on the service node, determine to send the L2TP tunnel control message to the other service node on which the state of the backup group is standby.

Preferably, the service backup protocol comprises: a Broadband Network Access Server (BNAS) device service backup protocol and an inter-chassis communication protocol.

With the service node and the method for synchronizing user protocol messages between service nodes provided in the present document, when receiving a user-related protocol message, a service node judges whether a state of a backup group to which a user belongs corresponding to the protocol message is active or standby on the service node, and according to a type of the protocol message, determines whether to send the protocol message to another service node on which the state of the backup group is standby or active; and when determining to send the protocol message, the service node encapsulates the protocol message through a service backup protocol and sends the protocol message to the other service node.

In the example of the present document, complete synchronization of the user-related protocol messages in the user service backup protocol is implemented, protocol connection maintained by the server side will not be aggravated, and configuration complexity and configuration error risk of the service nodes also will not be aggravated.

PREFERRED EMBODIMENTS OF THE INVENTION

The technical scheme of the present document will be further described in detail in combination with the accompanying drawings and specific examples below.

In order to implement complete synchronization of user-related protocol messages between service nodes in a user service backup protocol, the basic idea of the present document is: when receiving a user-related protocol message, a service node judging whether a state of a backup group to which a user belongs corresponding to the protocol message is active or standby on the service node, and according to a type of the protocol message, determining whether to send the protocol message to another service node on which the state of the backup group is standby or active; and when determining to send the protocol message, the service node encapsulating the protocol message through a service backup protocol and sending the protocol message to the other service node, so as to implement the synchronization of the user-related protocol messages between the service nodes.

Figure 1:
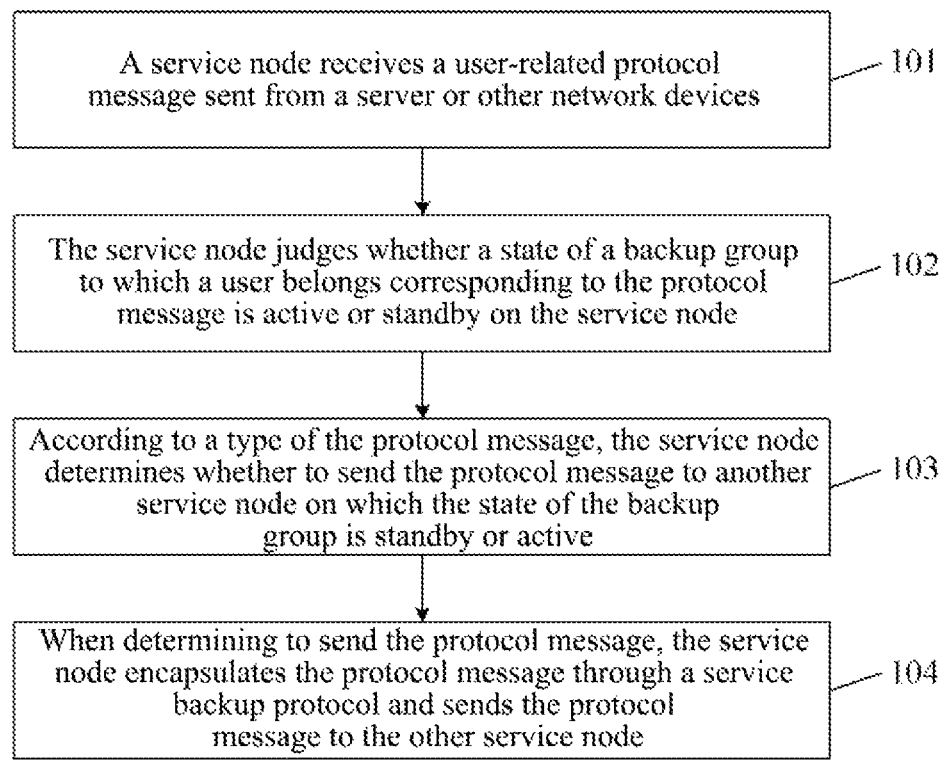
FIG. 1 is a flow diagram of a method for synchronizing user protocol messages between service nodes according to the example of the present document.

A method for synchronizing user protocol messages between service nodes provided by the present document is as shown in FIG. 1, and the following steps are mainly included.

In step 101, a service node receives a user-related protocol message sent from a server or other network devices.

The service node in the present document is a device such as a BRAS, an SR, a BNAS and a BNG and so on. These devices will receive user-related protocol messages from an AAA server, a DHCP server and a Portal server or other network devices.

In step 102, the service node judges whether a state of a backup group to which a user belongs corresponding to the protocol message is active or standby on the service node.

According to the received protocol message, the service node judges whether the state of the backup group to which the user belongs corresponding to the protocol message is an active state or a standby state on the service node.

In step 103, according to a type of the protocol message, the service node determines whether to send the protocol message to another service node on which the state of the backup group is standby or active.

When the type of the protocol message received by the service node is a protocol message from an AAA server, a DHCP server or a Portal server, if a state of a backup group to which a user belongs corresponding to the protocol message is standby on the service node, it is determined to send the protocol message to the other service node on which the state of the backup group is active; and when the type of the protocol message received by the service node is an L2TP tunnel control message, if a state of a backup group to which a user belongs corresponding to the L2TP tunnel control message is active on the service node, it is determined to send the L2TP tunnel control message to the other service node on which the state of the backup group is standby.

In step 104, when determining to send the protocol message, the service node encapsulates the protocol message through a service backup protocol and sends the protocol message to the other service node. The service backup protocol includes: a BNAS device Service Backup Protocol (SBP) and an Inter-Chassis Communication Protocol (ICCP).

In the example of the present document, the service backup protocol needs to be extended to support encapsulation of the protocol message, that is, the service node can correctly encapsulate and decapsulate various protocol messages through the service backup protocol.

The service backup protocol between the service nodes has existed in the related art, protocol messages sent from the AAA server, DHCP server and Portal server to the service node corresponding to the backup group in the standby state can be encapsulated by extending the protocol, and the protocol messages can be sent to the service node on which the state of the backup group to which the user belongs is active. Meanwhile, the present document also can be used for state synchronization of other user-related protocols from an active service node to a standby service node, such as the state synchronization of the L2TP tunnel, whether the service node serves as an L2TP Access Concentrator (LAC) or an L2TP Network Server (LNS), the L2TP tunnel control message can be sent from the active device to the standby device via the SBP, so as to implement synchronization of the protocol state of the L2TP tunnel between the active device and the standby device, and to better implement the consistency of user services before and after the active-standby switching.

Figure 2:
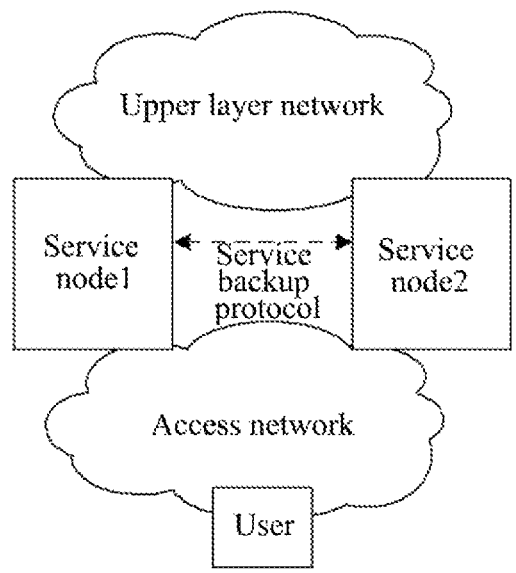
FIG. 2 is a schematic diagram 1 of network topology structure according to the example of the present document.

With reference to the network topology structure shown in FIG. 2, a user accesses service nodes through an access network, and a backup group (or called as a user group) to which the user belongs deploys a service backup mechanism between a service node 1 and a service node 2, that is, a state of the backup group on the service node 1 is active and the state of the backup group on the service node 2 is standby. One or multiple backup groups between the service node 1 and the service node 2 uniformly interact with a server of an upper layer network or other network devices through an IP on the service node 1, only in a case that the complete machine of the service node 1 is disabled, routing of the IP in the upper layer network will point to the service node 2.

When a type of the protocol message received by the service node 2 is a protocol message from the AAA server, the DHCP server or the Portal server, if it is determined that the state of the backup group to which the user belongs corresponding to the protocol message is standby on the service node 2, the service node 2 sends the protocol message to another service node (i.e. the service node 1) on which the state of the backup group is active through the SBP; and when a type of the protocol message received by the service node 1 is an L2TP tunnel control message, if it is determined that the state of the backup group to which the user belongs corresponding to the L2TP tunnel control message is active on the service node 1, the service node 1 sends the L2TP tunnel control message to another service node (i.e. the service node 2) on which the state of the backup group is standby through the SBP.

The above method for synchronizing the user protocol messages will be further described in detail in combination with specific examples below.

Figure 3:
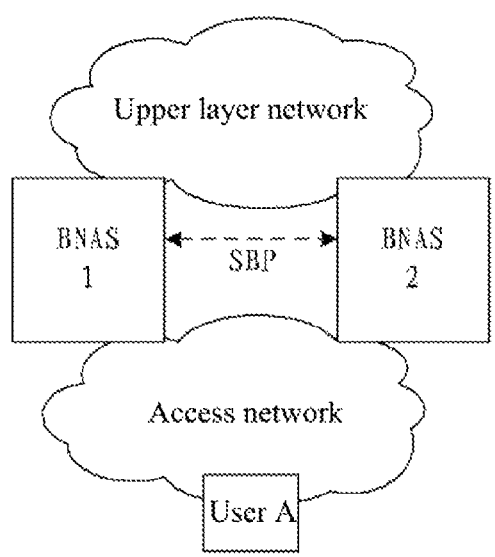
FIG. 3 is a schematic diagram 2 of network topology structure according to the example of the present document.

In the example 1 of the present document, after a user is online, in the process of the user accessing the network, a backup group to which the user belongs performs switching to another service node due to a downlink fault of the original service node, the user subscribes a Video On Demand (VOD) program at this point, a video on demand service system notifies the original service node to change service parameters (such as bandwidth and accounting policy and so on) of the user by an AAA server sending a Radius COA message, the original service node sends the message to another service node through the SBP protocol, and the change of service parameters of the user is implemented eventually. In combination with the network topology structure shown in FIG. 3, the method for synchronizing messages of the example includes the following steps specifically.

In step 301, a user A gets online through a BNAS device (i.e. a BNAS1) and access the network, and a backup group (or called as a user group) to which the user A belongs deploys a service backup mechanism between the BNAS1 and another BNAS device (i.e. a BNAS2), that is, a state of the backup group on the BNAS1 is active and the state of the backup group on the BNAS2 is standby. One or multiple backup groups between the BNAS1 and the BNAS2 uniformly interact with an AAA server through an IP1 on the BNAS1, only in a case that the complete machine of the BNAS1 is disabled, routing of the IP1 in the upper layer network will point to the BNAS2.

In step 302, a downlink fault of the BNAS1 device corresponding to the user A occurs, it causes that the backup group to which the user belongs perform switching between the BNAS1 and the BNAS2, the state of the backup group on the BNAS 1 becomes standby, and the state of the backup group on the BNAS2 becomes active.

In step 303, the user clicks a certain VOD service.

In step 304, a video on demand service system notifies the BNAS1 to change service parameters (such as bandwidth and accounting policy and so on) of the user by an AAA server sending a Radius COA message.

In step 305, after receiving the Radius COA message, the BNAS1 determines that the state of the backup group to which the user A belongs corresponding to the Radius COA message is standby on the BNAS1.

In step 306, the BNAS1 encapsulates the Radius COA message through the SBP protocol and sends the Radius COA message to the BNAS2.

In step 307, after receiving the SBP protocol message, the BNAS2 parses the SBP protocol message, and determines that the SBP protocol message is the Radius COA message related to the user A, and the state of the backup group to which the user belongs is active on the BNAS2.

In step 308, the BNAS2 processes the Radius COA message, and the change of service parameters of the user is implemented.

Figure 4:
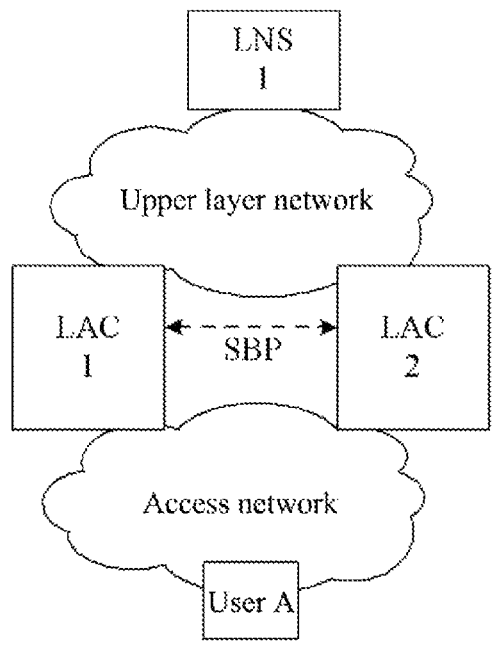
FIG. 4 is a schematic diagram 3 of network topology structure according to the example of the present document.

In the example 2 of the present document, after an L2TP tunnel is established, an active service node sends an L2TP tunnel control message of the user to a standby service node through the SBP protocol, which implements real-time change of the protocol state of the L2TP tunnel on the standby service node and eventually guarantees an accuracy of the protocol state of L2TP during switching between the active service node and the standby service node. In combination with the network topology structure shown in FIG. 4, the method for synchronizing messages of the example includes the following steps specifically.

In step 401, an L2TP user A gets on line through an L2TP tunnel between an LAC device (i.e. an LAC1) and an LNS device (i.e. an LNS1). A backup group (or called as a user group) to which the user A belongs deploys a service backup mechanism between the LAC1 and another LAC device (i.e. an LAC2), that is, a state of the backup group on the LAC1 is active and the state of the backup group on the LAC2 is standby. An opposite end LNS device configured by each of the LAC1 and the LAC2 is the LNS1.

In step 402, after receiving an L2TP tunnel control message sent by the LNS1, the LAC1 determines that the state of the backup group to which the user A belongs corresponding to the L2TP tunnel control message is active on the LAC1.

In step 403, the LAC1 encapsulates the protocol message through the SBP protocol and sends the protocol message to the LAC2.

In step 404, after receiving the SBP protocol message, the LAC2 parses the SBP protocol message, and determines that the SBP protocol message is the L2TP tunnel control message, and the state of the backup group to which the user belongs corresponding to the L2TP tunnel control message is standby on the LAC2.

In step 405, the LAC2 processes the L2TP tunnel control message, and updates the protocol state of the backup L2TP tunnel.

In step 406, when a fault occurs in an uplink port of the LAC1 device, the L2TP between the LAC1 and the LNS1 is also disabled, switching between the LAC1 and the LAC2 is implemented through the service backup mechanism, that is, the state of the backup group on the LAC1 becomes standby, the state of the backup group on the LAC2 becomes active, and the back-up L2TP tunnel of the LAC2 also turns into the active state.

Figure 5:
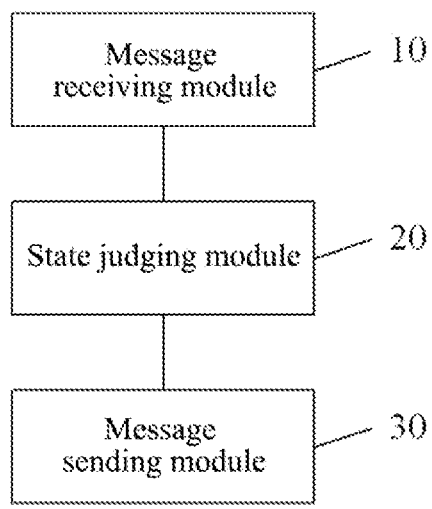
FIG. 5 is a schematic diagram of structure of a service node according to the example of the present document.

Corresponding to the above method for synchronizing the user protocol messages, the example of the present document also provides a service node, and as shown in FIG. 5, a message receiving module 10, a state judging module 20 and a message sending module 30 are included. Wherein, the message receiving module 10 is used to: receive a user-related protocol message. The state judging module 20 is used to: judge a state of a backup group to which a user belongs corresponding to the protocol message on the service node, wherein the state is active or standby; and according to a type of the protocol message, determine whether to send the protocol message to another service node on which the state of the backup group is standby or active. The message sending module 30 is used to: when determining to send the protocol message, encapsulate the protocol message through a service backup protocol and send the protocol message to the other service node.

Preferably, the state judging module 20 is further used to: when the type of the protocol message received by the message receiving module is a protocol message from an AAA server, a DHCP server or a Portal server, if a state of a backup group to which a user belongs corresponding to the protocol message is standby on the service node, determine to send the protocol message to the other service node on which the state of the backup group is active; and when the type of the protocol message received by the message receiving module is an L2TP tunnel control message, if a state of a backup group to which a user belongs corresponding to the L2TP tunnel control message is active on the service node, determine to send the L2TP tunnel control message to the other service node on which the state of the backup group is standby.

In conclusion, through the present document, complete synchronization of the user-related protocol messages in the user service backup protocol is implemented, and in the technical scheme of the present document, protocol connection maintained by the server side will not be aggravated, and configuration complexity and configuration error risk of the service nodes also will not be aggravated.

The above description is only the preferred examples of the present document, which is not used to limit the protection scope of the present document.

INDUSTRIAL APPLICABILITY

In the example of the present document, complete synchronization of the user-related protocol messages in the user service backup protocol is implemented, protocol connection maintained by the server side will not be aggravated, and configuration complexity and configuration error risk of the service nodes also will not be aggravated.

What is claimed is:

1. A method for synchronizing user protocol messages between service nodes, comprising:
   when receiving a user-related protocol message, a service node judging whether a state of a backup group to which a user belongs corresponding to the protocol message is active or standby on the service node, and according to a type of the protocol message, determining whether to send the protocol message to another service node on which the state of the backup group is standby or active; and
   when determining to send the protocol message, the service node encapsulating the protocol message through a service backup protocol and sending the encapsulated protocol message to the other service node;
   wherein when the type of the protocol message received by the service node is a protocol message from an Authentication Authorization and Accounting (AAA) server, a Dynamic Host Configuration Protocol (DHCP) server or a portal authentication protocol (Portal) server, if a state of a backup group to which a user belongs corresponding to the protocol message is standby on the service node, the service node sending the protocol message to the other service node on which the state of the backup group is active;
   wherein when the type of the protocol message received by the service node is a Layer 2 Tunneling Protocol (L2TP) tunnel control message, if a state of a backup group to which a user belongs corresponding to the L2TP tunnel control message is active on the service node, the service node sending the L2TP tunnel control message to the other service node on which the state of the backup group is standby.

2. The method for synchronizing user protocol messages between service nodes according to claim 1, wherein, the service backup protocol comprises: a Broadband Network Access Server (BNAS) device service backup protocol and an inter-chassis communication protocol.

3. A service node device, comprising a processor executing steps in message receiving module, state judging module and message sending module, wherein:
   the message receiving module, configured to: receive a user-related protocol message;
   the state judging module, configured to: judge a state of a backup group to which a user belongs corresponding to the protocol message on the service node, wherein the state is active or standby; and according to a type of the protocol message, determine whether to send the protocol message to another service node on which the state of the backup group is standby or active; and
   the message sending module, configured to: when determining to send the protocol message, encapsulate the protocol message through a service backup protocol and send the encapsulated protocol message to the other service node;
   wherein the state judging module is further configured to: when the type of the protocol message received by the message receiving module is a protocol message from an Authentication Authorization and Accounting (AAA) server, a Dynamic Host Configuration Protocol (DHCP) server or a portal authentication protocol (Portal) server, if a state of a backup group to which a user belongs corresponding to the protocol message is standby on the service node, determine to send the protocol message to the other service node on which the state of the backup group is active;

wherein, the state judging module is further configured to: when the type of the protocol message received by the message receiving module is a Layer 2 Tunneling Protocol (L2TP) tunnel control message, if a state of a backup group to which a user belongs corresponding to the L2TP tunnel control message is active on the service node, determine to send the L2TP tunnel control message to the other service node on which the state of the backup group is standby.

4. The service node device according to claim 3, wherein, the service backup protocol comprises: a Broadband Network Access Server (BNAS) device service backup protocol and an inter-chassis communication protocol.

5. The service node device according to claim 3, wherein, the service backup protocol comprises: a Broadband Network Access Server (BNAS) device service backup protocol and an inter-chassis communication protocol.

\* \* \* \* \*